March 22, 1966     W. E. SCHROEDER ETAL     3,241,365

FLOW GAUGE

Filed March 12, 1963     2 Sheets-Sheet 1

INVENTORS
William E. Schroeder
Herman F. Holl
BY
THEIR ATTORNEYS

United States Patent Office 3,241,365
Patented Mar. 22, 1966

3,241,365
FLOW GAUGE
William E. Schroeder, Fox Chapel, and Herman F. Holl, Pittsburgh, Pa., assignors to Schroeder Brothers Corporation, McKees Rocks, Pa.
Filed Mar. 12, 1963, Ser. No. 264,555
3 Claims. (Cl. 73—211)

This application relates to a flow gauge, more particularly to a flow gauge intended for use in a portable hydraulic circuit tester. It is frequently necessary to test components of a hydraulic system, such as pumps, valves, motors, etc., to determine the fluid flow through them under varying conditions of load and temperature. For such tests, it is desirable to use a portable circuit tester which can be brought to the component to be tested rather than to disassemble a hydraulic machine and take the component to a test bench. A portable hydraulic circuit tester should be extremely sturdy, capable of withstanding abuse, both from handling and from improper use in a hydraulic circuit, simple to operate and preferably available at a relatively low cost.

In hydraulic circuit testers, the flow in terms of gallons per minute is measured by causing the fluid to flow through an orifice of fixed and known diameter and by measuring the difference in pressure between the upstream and downstream sides of the orifice. To measure this difference in pressure, differential pressure gauges have been used which are calibrated so that their scales read in terms of gallons per minute. These differential pressure gauges constitute the most expensive single element in a portable tester. They must be carefully made so as to be accurate, yet at the same time, they must be able to withstand sudden pressure changes or surges in the component which is being tested. We have invented a flow gauge which is simple to make and install in a portable tester, which is accurate, which can withstand sudden pressure surges and which can be manufactured at considerably lower cost than flow gauges using differential pressure gauges which have heretofore been used in hydraulic circuit testers, either portable or stationary.

In the accompanying drawings, we have illustrated certain presently preferred embodiments of our invention in which.

Figure 1:
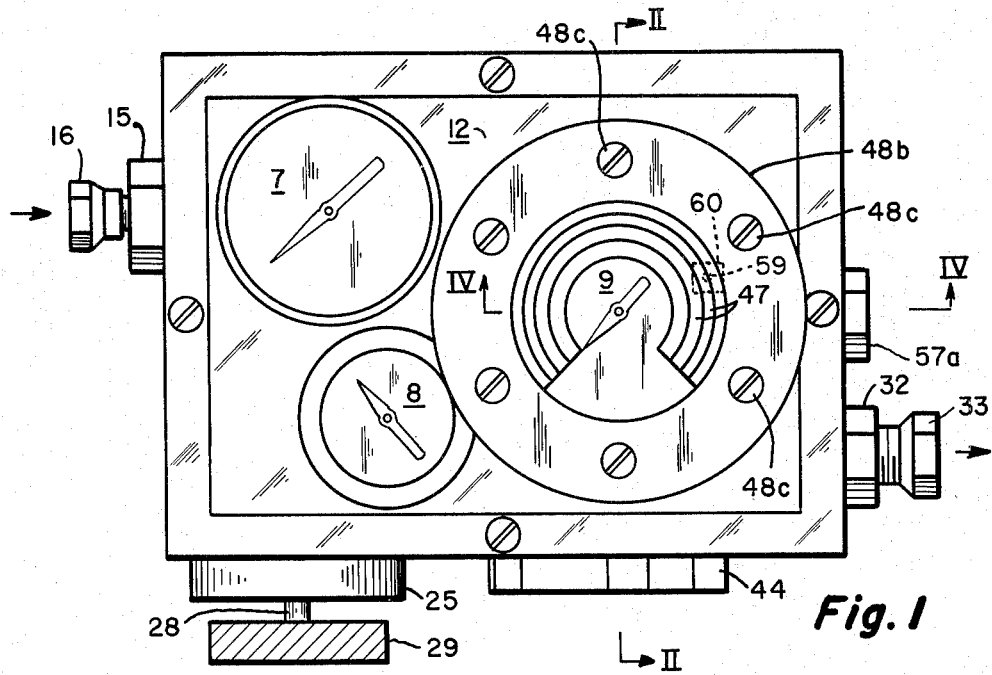
FIGURE 1 is a plan view of a hydraulic circuit tester embodying our flow gauge.

In the accompanying drawings, we have shown our flow guage incorporated in a hydraulic circuit tester. The tester includes a block 6 on which are mounted gauges used for testing such as a pressure gauge 7 which measures the pressure of the fluid entering the tester, a temperature gauge 8 and a flow gauge 9. The tester also has a load valve generally designated 10 and an orifice valve generally designated 11 (see FIGURE 3). The three gauges are all positioned beneath a heavy piece of transparent plastic 12 such as the acrylic resin sold under the trademark "Plexiglas." This transparent sheet has the same dimensions as the top of the block 6 and is supported above the block by metal plates 13 which extend along and up from the edges of the top of the block.

Figure 3:
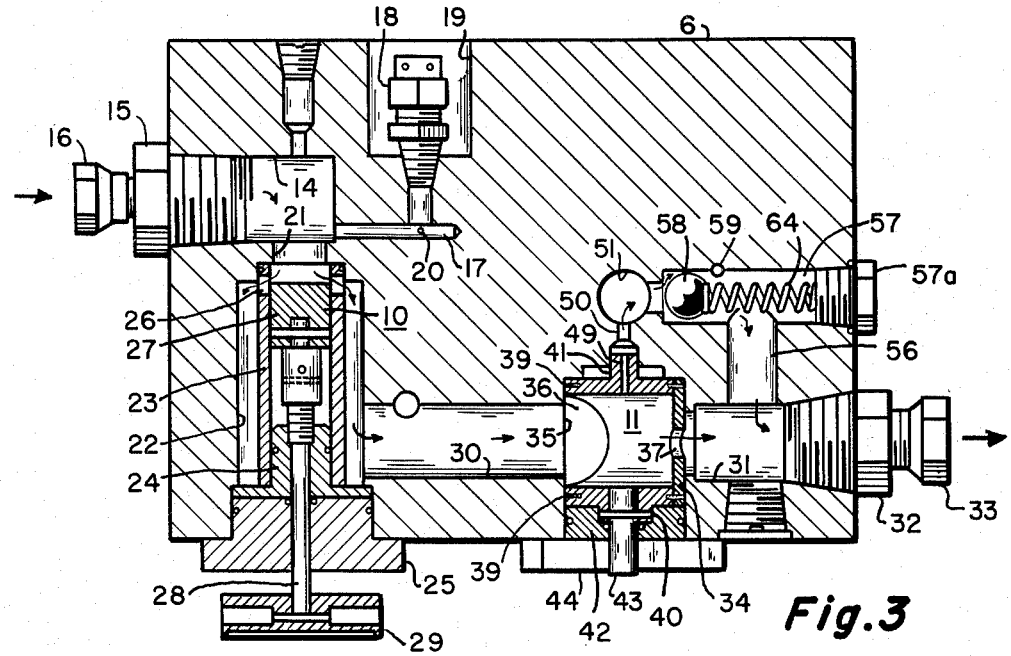
FIGURE 3 is a section along the lines III—III of FIGURE 2.

Passageways formed in the block 6 providing for the flow of the fluid to be measured through the tester, for connecting the gauges into the flow and for mounting the load valve and orifice valve are best shown in FIGURE 3.

An inlet passage 14 is threaded to receive an adapter such as shown at 15 which in turn carries a pipe coupling 16 whereby fluid under pressure from the hydraulic device being tested is led into the tester. A small passageway 17 leads from the inlet passageway 14 to a high pressure blowout plug 18 mounted in a bore 19 in the back of the block 6. A small bore 20 leads vertically upward from the bore 17 to the pressure gauge 7.

A passageway 21 leads from the inlet passage 14 to the loading valve 10 which is mounted in a bore 22 drilled inwardly from the front of the block 6. The valve comprises a sleeve 23 which is held in line with the passageway 21 by a cap 24 and plug 25 bolted to the block. The inner end of the sleeve 23 has apertures 26 which may be variably opened by a plug 27 which seals the interior of the sleeve 23. A valve stem 28 threaded in the cap 24 carries the plug 27 at its inner end and has a handle 29 at its outer end whereby the stem can be turned to move the plug 27 in and out of the sleeve 23 and thereby vary the amount that the apertures 26 are opened. As shown in FIGURE 3, the bore 22 is larger in diameter than the exterior diameter of the sleeve 23 so that fluid can flow through the apertures 26 and through the annular space between the sleeve 23 and the bore 22 to a passage 30 which leads to the orifice valve generally designated 11. Fluid flows through the orifice valve to an outlet passage 31 which carries a reducing bushing 32 which in turn carries a pipe coupling 33 whereby the outlet of the tester can be connected to a reservoir tank.

The orifice valve 11 comprises a hollow cylinder 34 which turns in a bore 35 extending inwardly from the front of the block 6 and at right angles to the passageway 30. The cylinder 34 has a large aperture 36 which permits fluid to enter the cylinder 34 without restriction and at least two small orifices such as the orifice 37 shown in FIGURE 3 and the orifice 38 shown in FIGURE 2. The ends of the cylinder 34 are closed by circular disks 39 which carry hubs 40 and 41 on their outer sides. The hub 40 turns in a plug 42 which closes the outer end of the bore 35. A stem 43 secured in the hub 40 extends through the plug 42 and carries a handle 44 whereby the cylinder 34 can be rotated so as to allow fluid to pass through one of the orifices 37 or 38 and close off the other orifice. The hub 41 turns in a small bore formed in the block 6 inwardly of the bore 35.

Figure 2:
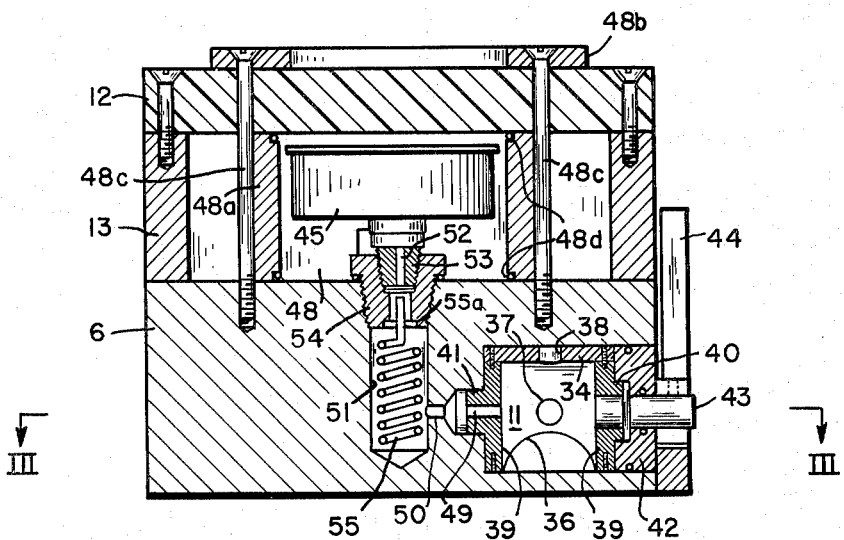
FIGURE 2 is a section along the lines II—II of FIGURE 1.
Figures 4, 5:
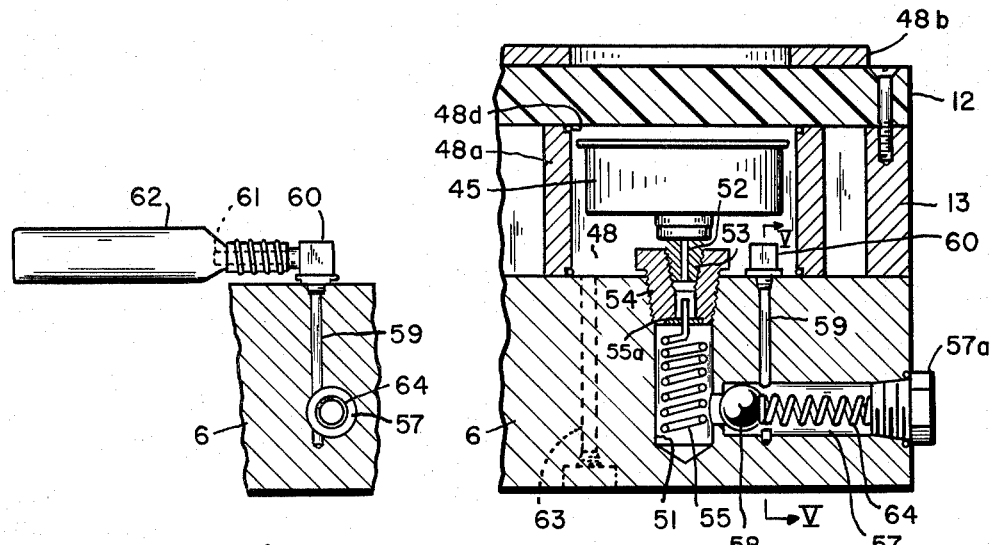
FIGURE 4 is a section along the lines IV—IV of FIGURE 1.
FIGURE 5 is a section along the lines V—V of FIGURE 4.

FIGURES 2 and 4 show the construction of our flow gauge. It comprises a single Bourdon tube 45 which, through conventional linkage, actuates a needle (see FIGURE 1) which indicates the fluid flow on scales 47 which are calibrated to show flow in gallons per minute. The Bourdon tube 45 is positioned in a fully enclosed hollow space 48 in which, as later explained, fluid is maintained under a pressure equal to the pressure in the passageway 31 which is downstream of the orifice valve. Also as later explained, the interior of the Bourdon tube is subjected to pressure on the upstream side of the orifice and thus the gauge shows the difference in pressures in the fluid upstream and downstream of the orifice. In accordance with standard procedures, scales 47 of the gauge are calibrated to indicate flow in gallons per minute.

The enclosed space 48 is formed by a ring 48a which extends between the top of the block 6 and the lower surface of the cover 12 and surrounds the tube 45. To make the space 48 fluid tight, a retainer ring 48b on top of the cover 12 and bolt 48c press the cover against the ring 48a and the ring against the top of the block 6. O-rings 48d seal the joints between the ring 48a and the block and the cover.

Fluid under pressure on the upstream side of the orifice valve flows through a small passageway 49 formed in the trunnion 41 of the orifice valve to a passage 50 which leads to a well or closed hollow container 51 having a capacity greater than the passageway 49 which extends vertically downward from the top of the block 6 beneath the Bourdon tube 45. The stem 52 of the Bourdon tube 45 fits into a bushing 53 which, in turn, is threaded into a reducing bushing 54, this latter bushing being threaded into the top of the block 6 in line with the well 51. The bushing 54 also carries a coil 55 of capillary tubing which extends down into the well 51 and acts as a dampener for the Bourdon tube. A washer 55a secured to the tubing and the end of the bushing 54 nearest the well 51 holds the coil 55 in the bushing. Fluid passing from the upstream side of the orifice fills the well 51 and flows upwardly in the capillary tubing into the Bourdon tube.

Fluid under pressure on the donwstream side of the orifice valve flows from the passageway 31 through a passageway 56 extending at right angles to the passageway 31 and connecting with a passageway 57 which is formed by a bore cut inwardly from the side of the block 6 and parallel to the passageway 31. The passageway 57 leads to the bottom of the well 51 and at a point near, but spaced from the well 51, it is reduced in diameter to form a seat for a ball check 58, the purpose of which will be later described. The outer end of the passageway 57 is closed by a plug 57a. A small passageway 59 extends vertically in the block 6 from the passageway 57 through the top surface of the block 6 within the hollow space 48.

Fluid under the pressure of the downstream side of the orifice may flow through passageways 56, 57 and 59 and fill the space around the Bourdon tube 45. However, when oil is used in hydraulic machinery, it rapidly becomes dirty and substantially non-transparent so that if oil used in the machinery was allowed to fill the space 48, it would be difficult, if not impossible, to read the scale on the flow gauge. Therefore, at the outlet of the passageway 59 in the space 48, we connect a fitting 60 having a tubular extension 61 to which we secure a small bag 62 of flexible material (see FIGURE 5) so that oil from the downstream side of the orifice flows into and expands the bag. The space 48 is then filled with a clear fluid through a passageway 63 extending from the bottom of the block to the space 48 (see FIGURE 4). Pressure within the bag 62 is transmitted to the exterior of the Bourdon tube 45 by this clear fluid.

Our hydraulic tester must be capable of being used in hydraulic systems in which the fluid may be under high pressures, i.e., pressures in the order of 1,000, 1,500 and 2,000 pounds per square inch and in which pressure drops as high as 1,500 pounds per square inch may develop across the orifice, if the tester is improperly used. However, in order to keep manufacturing costs and the pressure drop consumed in testing as low as possible the flow gauge is designed to give flow readings which are based on relatively low pressure drops, for example, pressure drops of from 0 to 200 pounds per square inch, and the maximum pressure difference which the gauge will withstand may be no more than 300 pounds.

Accordingly, we provide a circuit to protect the gauge in the event of high pressure drops across the orifice. From the drawings, it will noted that the passageways 49 and 50 which lead from the upstream side of the orifice into the well 51 are quite small in capacity relative to the capacity of the ball check valve 58 and the passageway 56. A spring 64 in the ball check valve is selected so that the valve will open when pressure in the well 51 reaches a value which is above the top reading on the flow gauge but which is below the maximum pressure which the Bourdon tube will withstand without breaking. The relative capacities of the passageways 49 and 50 on the one hand and the relief valve on the other hand are such that when the valve opens it prevents pressure differences building up in the well 51 which are high enough to break the Bourdon tube, even though there is a pressure drop across the orifice many times that in excess of that required to break the Bourdon tube.

The fluid capacity of the passageway 49 on the upstream side of the gauge and the fluid capacity of the passageway 59 on the downstream side of the gauge are determined in accordance with the intended use of the tester. First, the diameter of the downstream passageway 59 is selected to be the minimum practical diameter that can be used in accordance with the viscosity of the fluids to be measured and the range of possible back pressures which the tester may be expected to encounter. The diameter of the passageway 49 on the upstream side of the orifice is made larger than the passageway 59 so that there will always be a faster build-up of pressure in the well 51 from the upstream side than the pressure build-up in the space 48 from the downstream side. This will prevent the collapse of the Bourdon tube in the event that a high back pressure develops on the downstream side of the orifice and will also provide sufficient fluid flow to produce fast response by the gauge to pressure changes. The capillary tube 55 has a snubbing effect on changes in pressure in the well 51 so that in the event an excess in pressure develops in the well 51 the check valve 58 opens before the Bourdon tube is damaged.

So far as the capacity of the ball check valve 58 is concerned, a gauge is first selected which will measure pressures over the range desired and the amount of pressure required to break the gauge is determined. This breaking pressure, of course, is above the top reading of the gauge, and the relief valve should open at some intermediate pressure between the top reading of the gauge and the pressure required to break the gauge, and, as noted, a spring for the relief valve is selected so that the valve will open at the intermediate pressure selected. The diameter of the relief valve passage is determined by the value of the maximum pressure drop across the orifice to which the gauge may be expected to be subjected. Since the orifices are fixed, the flow rate which will produce the pressure drop is known. Therefore, the diameter of the relief valve passage is made sufficiently large that such a flow rate will not develop a pressure difference which will break the gauge.

From the foregoing, it is apparent that we have invented a flow gauge which is rugged and can be incorporated in a portable hydraulic tester to measure flows produced over a wide range of pressures. The gauge is of simpler construction than differential pressure gauges heretofore used, and, therefore, can be manufactured and assembled at considerably lower cost than such gauges. This factor will considerably decrease the overall cost of a portable hydraulic tester. Our flow gauge is particularly useful in testing hydraulic machinery components which operate in high pressure ranges where large pressure drops may develop across the orifice of the flow gauge if it is improperly used.

While we have described a certain presently preferred embodiment of our invention, it is to be understood that it may be otherwise variously embodied within the scope of the appended claims.

We claim:
1. A flow gauge comprising,
 (A) a first passageway for the flow of fluid to be measured,
 (B) an orifice of predetermined diameter in said passageway,
 (C) a pressure gauge for indicating differences in pressure in said passageway between the upstream and downstream sides of said orifice,
 (D) a second passageway having a small fluid capacity relative to said first passageway and connecting said gauge to said first passageway upstream of said orifice,
 (E) a third passageway having a small fluid capacity relative to said first passageway and connecting said gauge to said first passageway downstream of said orifice, and
 (F) a fourth passageway connecting a portion of said second passageway in advance of said gauge and a portion of said first passageway downstream of said orifice, said fourth passageway having
- (1) a large fluid capacity relative to said second passageway, and
- (2) a pressure relief valve opening to said first passageway downstream of said orifice upon a predetermined difference between the pressure in said second passageway and the pressure in said first passageway downstream of said orifice.

2. A flow gauge as described in claim 1 in which said pressure gauge comprises an enclosed hollow space and a single Bourdon tube within said space and in which said second passageway connects the Bourdon tube with said first passageway upstream of said orifice and said third passageway transmits the pressure within said first passageway downstream of said orifice to said enclosed space and around said Bourdon tube.

3. A flow gauge comprising,
- (A) a first passageway for the flow of fluid to be measured,
- (B) an orifice of predetermined diameter in said passageway,
- (C) a pressure gauge for indicating differences in pressure in said passageway on opposite sides of said orifice,
- (D) a closed hollow container,
- (E) a second passageway having a small fluid capacity relative to said first passageway and connected to said first passageway upstream of said orifice and to said container,
- (F) a capillary tube having one end connected to said gauge and the other end extending into said container,
- (G) a third passageway having a small fluid capacity relative to said first and second passageways and connecting said gauge to said first passageway downstream of said orifice, and
- (H) a fourth passageway connecting said container and a portion of said first passageway downstream of said orifice, said fourth passageway having
  - (1) a large fluid capacity relative to said second passageway, and
  - (2) a pressure relief valve opening to said first passageway downstream of said orifice upon a predetermined difference between the pressure in said container and the pressure in said first passageway downstream of said orifice.

References Cited by the Examiner

UNITED STATES PATENTS

| | | | |
|---|---|---|---|
| 1,340,198 | 5/1920 | Wilkinson | 73—412 |
| 1,559,156 | 10/1925 | Bullock | 73—211 |
| 1,700,449 | 1/1929 | Reilly | 73—392 X |
| 1,729,178 | 9/1929 | Motheral | 73—412 |
| 1,941,613 | 1/1934 | McDonell | 73—392 X |
| 2,071,191 | 2/1937 | Wotring | 73—412 |
| 2,718,241 | 9/1955 | Newell | 73—412 X |
| 3,037,384 | 6/1962 | Good | 73—211 |
| 3,095,745 | 7/1963 | Kirwan | 73—412 |

LOUIS R. PRINCE, *Primary Examiner.*

RICHARD QUEISSER, DAVID SCHONBERG,
*Examiners.*